June 9, 1936. J. H. LUFT 2,043,297
FLOWER HOLDER
Filed Nov. 7, 1933
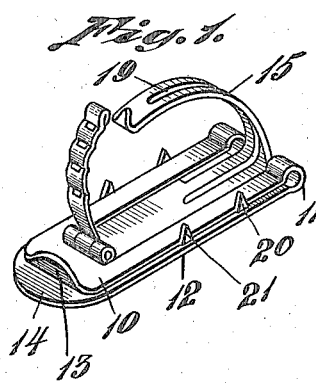
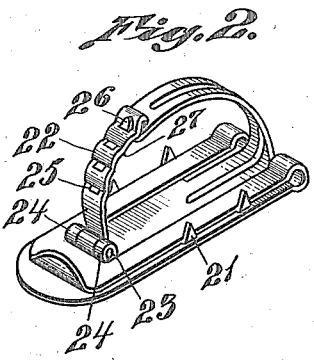
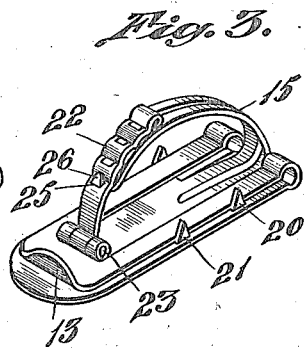
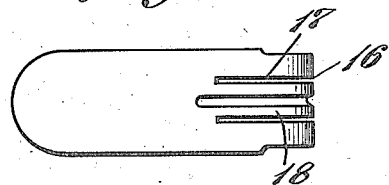
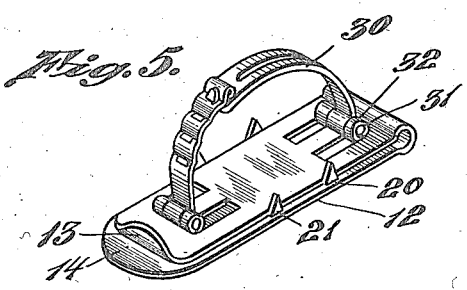
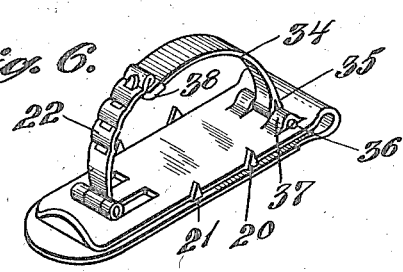
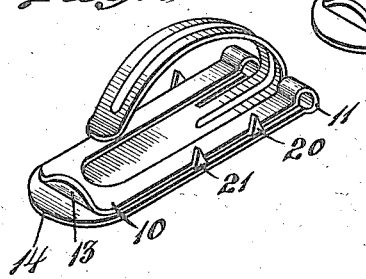
INVENTOR.
John H. Luft
BY Barlow & Barlow
ATTORNEYS.

Patented June 9, 1936

2,043,297

UNITED STATES PATENT OFFICE 2,043,297

FLOWER HOLDER

John H. Luft, Providence, R. I.

Application November 7, 1933, Serial No. 697,014

10 Claims. (Cl. 24—5)

This invention relates to a flower holder; and has for one of its objects the provision of a device into which the stems of a bunch of flowers may be readily placed and securely locked in position therein.

Another object of the invention is the provision of a flower holder which may be formed without the use of solder for securing any of the parts together which might anneal or affect the temper of the stock.

Another object of the invention is the provision of means which will completely encircle the flowers to strengthen the engaging relation of the parts and more firmly bind the stems of a bunch of flowers in position.

Another object of the invention is the provision of an arm having resiliency away from the stems of the bunch of flowers so that if lifted to an extent greater than necesasry for insertion of the flowers it will not be damaged but rather strengthened in its engagement with the locking arm for securing the stems in the desired position.

Another object of the invention is the provision of an arm of great resiliency by reason of its extended length thereof so that the same will be highly flexible and not easily distorted from its position to such an extent as to be injurious to the same.

A further object of the invention is the provision of spurs for biting into the bunch of stems for better securing them in position.

With these and other objects in view, the invention consists of certain novel features of construction, as will be more fully described, and particularly pointed out in the appended claims.

In the accompanying drawing:

Fig. 1 is a perspective view of my improved flower holder with its clasping arms in detached position.

Fig. 2 is a similar view showing the two arms as interchanging in one position of adjustment.

Fig. 3 is a similar view showing the arms interchanged for embracing a smaller bunch of stems than will be received in the position shown in Fig. 2.

Fig. 4 is a bottom plan view of the device.

Fig. 5 is a perspective of a modification illustrating a different manner of mounting one of the arms on the base.

Fig. 6 is a similar view of a still different modification.

Fig. 7 is a perspective view showing the device as formed with a single arm, illustrating the long resilient action thereof.

In the use of flower holders, such as shown in my Patent No. 1,918,115, issued July 11, 1933, it is found that should one lift the arm which projects from the base for insertion of flower stems thereunder to too great an extent that the same may be distorted and prevent a firm grip of this arm on the stems of a bunch of flowers, and in order that this may not occur, I have provided the arm of longer length and of greater resilience by extending it about the fold of the stock of the base to give it a greater resiliency and I have also provided a second arm to interlock with this first arm to maintain it in binding engagement with the stems of the bunch of flowers so that no chance is presented for the releasing of the same; and the following is a more detailed description of the present embodiment of this invention, illustrating the preferred means by which these advantageous results may be accomplished:—

With reference to the drawing, 10 designates the base which may be of any desired structure but is here illustrated as formed of sheet stock bent as at 11 to provide a back jaw 12 for gripping between the base and this back jaw a garment for mounting the same in position thereon. The end of the base is flared outwardly as at 13, to present a mouth 14 for the entrance of the fabric between this base 10 and the jaw 12 to be gripped thereby.

The stock of the base 10 is slit longitudinally thereof from which an arm 15 is raised while the slits extend about the fold as at 16 and into the jaw 12 as at 17 and extend for a substantial extent longitudinally thereof thus providing an extended portion 18 of the arm 15 and one having a long resilient action enabling considerable movement without distortion thereof. This arm may be used alone in some instances for gripping the stems of a bunch of flowers between it and the base 10, as illustrated in Fig. 7, it being assisted in this action by a stiffening rib 19 extending throughout the major portion of the curvature of the arm and particularly at the point thereof where the flexing of the stock will occur. This rib may be formed by raising the stock inwardly of and beneath the arm 15 so as not to interfere with the clasp which may be used therewith and will be presently described. Where the arm 15 alone is used, it will be positioned so as to tend to move the base when the flowers are in position.

The arm 15 is assisted in holding the stems of the bunch of flowers in position by prongs 20 and 21 folded up from the opposite edges of the base 10 to bite into the stems of the flowers and assist in preventing them from sliding.

In some instances, however, I may desire to more securely lock the flowers in position than where one arm alone is used and I then provide a second arm 22 having trunnions 23 hingedly mounted in eyes 24 rolled from the stock of the base to provide a hinge for the same. This arm is provided with a series of openings 25 for the reception of a locking finger 26 projecting outwardly from the arm 15 and adapted to snap into one of the series of these openings 25 which are separated by corrugations 27 between the openings 25. These corrugations also serve to assist in gripping the stems when engaged by the arm and more securely hold the bunch of flowers in the desired firm position. The series of openings afford adjustment for holding the stems of bunches of flowers having different sizes. In cases where the locking arm 22 is used, the arm 15 will be set at such a position that when engaged in any one of the openings, its inherent resiliency will tend to move it outwardly, which in most cases will also be assisted by the resiliency afforded in compressing the stems of the bunch of flowers with which it engages.

In some cases, instead of providing a long resilient arm 15 I may provide a metal arm 30 having trunnions 31 hinged in eyes 32 rolled up from the stock of the base, as illustrated in Fig. 5, while in Fig. 6 I may provide a flexible strap 34 of leather or like material having a loop 35 thru which a pin 36 extends to mount the device in eyes 37 formed from the stock of the base by cutting and raising portions therefrom. On the opposite end of this strap I will provide a hook 38 for engagement with a selected opening in the stiffer arm 22.

By this arrangement a bunch of flowers may be securely held in position without danger of the same falling out and without depending to such a large extent upon the inherent resiliency or spring of the stock for holding the parts in assembled position.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A flower holder comprising a base, means for attaching the base to an article of wearing apparel, a pair of arms mounted on the base to embrace the stems of a bunch of flowers, one of the arms being hinged to the base and the other arm rigid therewith.

2. A flower holder comprising a base, means for attaching the base to an article of wearing apparel, a pair of arms mounted on the base to embrace the stems of a bunch of flowers, one of the arms being hinged to the base and the other arm integral therewith and resilient to be placed under tension when engaged with the opposite arm.

3. A flower holder comprising a sheet metal base, integral spurs provided thereon in spaced relation along the opposite edges thereof for detachably engaging one side of the stems of a bunch of flowers, and means on the base for embracing said stems and engaging the other side of the bunch for mounting them on said flower holder, said base having a portion folded back to provide a pair of generally parallel gripping jaws and said spurs pointing away from said folded portion.

4. A flower holder comprising a base, means for attaching the base to an article of wearing apparel, a pair of arms mounted on the base in substantially the same plane to embrace the stems of a bunch of flowers, one of said arms being hinged to the base.

5. A flower holder comprising a base, means for attaching the base to an article of wearing apparel, a pair of arms mounted on the base to embrace the stems of a bunch of flowers, one of the arms being hinged to the base and the other arm rigid therewith, said arms being provided with interlocking means at their ends to secure the ends thereof together.

6. A flower holder comprising a base, means for attaching the base to an article of wearing apparel, a pair of arms mounted on the base to embrace the stems of a bunch of flowers, one of the arms being hinged to the base and the other arm rigid therewith, one of said arms being provided with a series of openings and the other arm with a projection to enter said openings to secure the arms together in the desired selected position of adjustment.

7. A flower holder comprising a base formed of sheet stock folded upon itself to provide a pair of gripping jaws, the stock of one jaw being slit along its length and about the fold into the other jaw, and a gripping arm raised from the stock between said slits and being carried about said fold, and a second arm hinged to said base and detachably engaging said other arm at selected location.

8. A flower holder comprising a base, means for attaching the base to an article of wearing apparel, and a pair of arms hingedly mounted on the base in substantially the same plane to embrace the stems of a bunch of flowers.

9. A flower holder comprising a base, means for attaching the base to an article of wearing apparel, a pair of arms hingedly mounted on the base to embrace the stems of a bunch of flowers, one of said arms having an opening adjacent its free end and the other arm having a projection to enter said opening to detachably secure the arms together.

10. A flower holder comprising a base, means for attaching the base to an article of wearing apparel, spurs provided on said base in spaced relation for engaging one side of the stems of a bunch of flowers, and a pair of arms mounted on the base to embrace said stems and engage the other side of the bunch of flowers, one of the arms being hinged to the base and the other arm rigid therewith.

JOHN H. LUFT.